Aug. 4, 1925.
P. W. BRITTS
1,548,253
PIPE DRIVING DEVICE
Filed June 19 1924
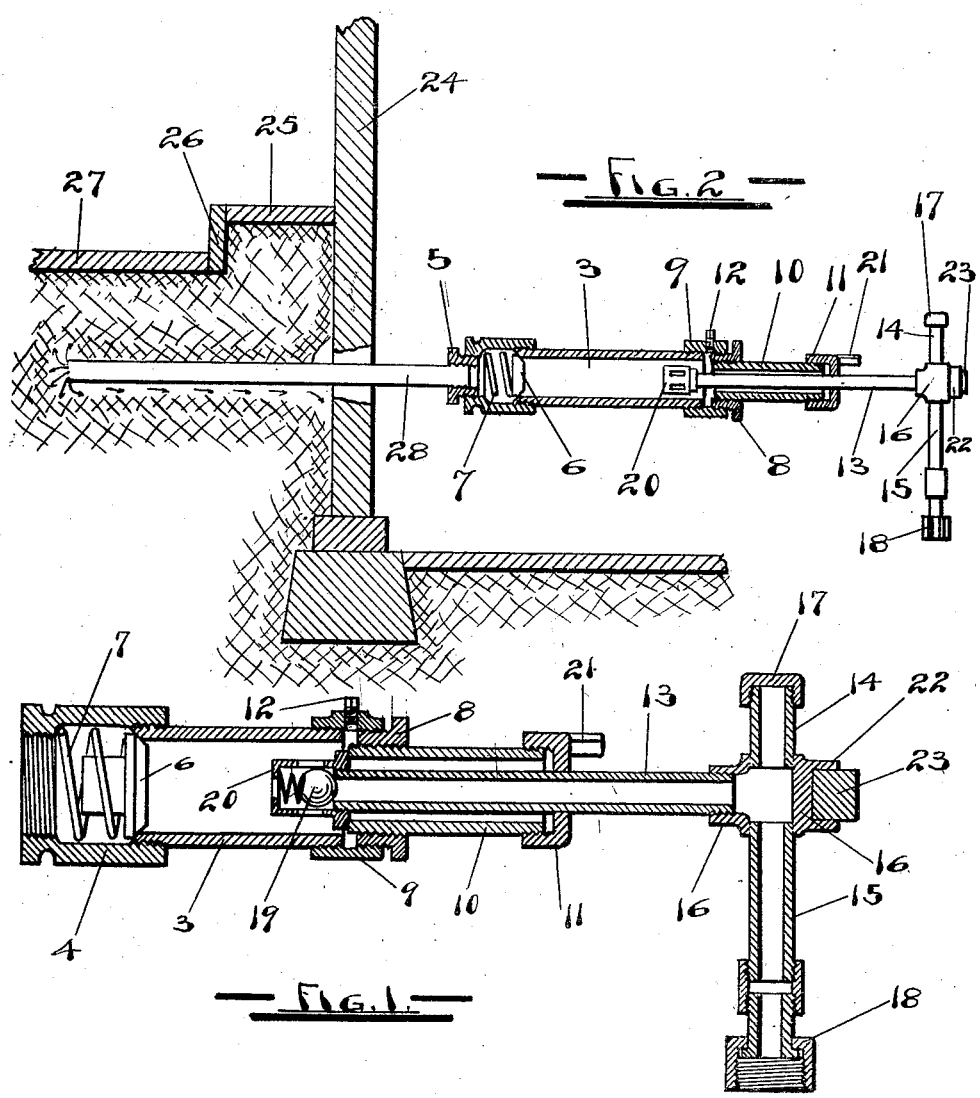
INVENTOR
PETER W. BRITTS
BY C.J. Blake
ATTY Patented Aug. 4, 1925.

1,548,253

UNITED STATES PATENT OFFICE.

PETER W. BRITTS, OF PORTLAND, OREGON.

PIPE-DRIVING DEVICE.

Application filed June 19, 1924. Serial No. 721,112.

*To all whom it may concern:*

Be it known that I, PETER W. BRITTS, a citizen of the United States, residing at Portland, county of Multnomah, State of Oregon, have invented certain new and useful Improvements in Pipe-Driving Devices, of which the following is a specification.

My invention relates to pipe driving devices in general, and is particularly adapted for driving pipe into earthen banks or the like, the object being to provide a device that will drive such pipe easily and quickly, that is cheap to manufacture and simple to use, and that will leave the driven pipe clean of débris on the inside thereof.

I accomplish these objects by means of the construction illustrated in the accompanying drawing, which is a part of this application for Letters Patent, like characters of reference indicating like parts throughout the several views thereof and in which:

Fig. 1 is a sectional elevation of my device, and Fig. 2 is a similar elevation upon a reduced scale and showing the device in use.

In general my device consists of a cylindrical barrel adapted to be secured upon one end of the pipe to be driven, a pipe slidable therein with a check valve mounted thereupon and communicating means for attaching a water hose to said latter pipe, and a check valve within said former cylindrical barrel.

The barrel 3 has a cylindrical fitting 4 thereupon, which fitting is threaded to receive bushings 5 to adapt it to various sizes of pipe, a check valve is mounted within said barrel, conveniently at the end thereof as shown at 6, and is held closed against the end of said barrel by a spring 7. A bushing 8 is mounted upon the opposite end of the barrel 3 by means of a union 9, and mounted in said bushing 8 is a pipe 10 of smaller diameter than the barrel 3.

The pipe 10 is capped at its outer end as shown at 11. A relief plug 12 is threaded into the union 9 for the purpose of relieving the device of air should such become entrapped therein during use.

Slidably mounted in a central orifice in the cap 11 is a pipe 13 with transverse pipes 14 and 15 secured thereto by a T fitting 16. The pipe 14 is capped as at 17, and the pipe 15 is provided with a hose connection 18.

The inner end of the pipe 13 is provided with a check valve 19 within a cage 20, and said cage is provided with a flange to form a shoulder to contact with the end of the pipe 10 and thus prevent the complete withdrawal of the slidable pipe 13 from the device. The cap 11 is provided with a lug 21 for the purpose of contacting with one of the transverse pipes 14 or 15 when the slidable pipe 13 is pressed completely into the device, thus providing a means whereby the entire device and the pipe attached thereto may be rotated by using the transverse pipes 14 and 15 as a handle.

The T fitting 16 is provided with a socket 22 in which is mounted a striking block 23 of rubber, wood, leather or like substance.

The device is intended for use of plumbers and others having to drive pipe through earth, and such use is illustrated in Fig. 2, wherein is shown in diagram form a building wall 24, walk 25, curb 26 and street pavement 27. To drive a pipe 28 into the earth beneath the walk and street, said pipe is secured upon my device by a suitable sized bushing 5, and a hose is connected at the hose connection 18. The water under pressure then flows from the hose through my device and through the pipe 28 to the end thereof, whence it issues forcibly, as shown in Fig. 2. Thus the earth immediately adjacent the end of the pipe 28 is softened and also partially washed away, and as this softening and washing away continues the pipe 28 is advanced into the hole thus caused.

By alternately withdrawing the pipe 28 a short distance and then forcing it suddenly against the earth the blows resulting facilitate the driving thereof.

The large barrel and smaller pipe 13 comprise together a hydrostatic pump, which is intended for use where water pressure is unavailable. In that case longitudinal motion of the pipe 13 within the barrel 3 will draw water into said barrel and forcibly expel it into the pipe 28, the check valve 6 being for the purpose of preventing the water returning into the barrel when the device is thus used.

When driving such pipe it sometimes becomes advisable to rotate the same, particularly should it become slightly bent and thereby deviate from its true course, and this rotation may easily be accomplished by pushing the pipe 13 entirely into the barrel, when one of the transverse pipes 14 or 15 will contact with the lug 21 and thus render the device and the pipe 28 readily rotatable from the handle pipes 14 and 15.

Should it become necessary to drive the pipe 28 through any substance not responsive to the action of the water, I provide the T fitting 16 with the striking block 23, so that when the pipe 13 is pushed entirely into the barrel said fitting contacts with the cap 11, and thus the block 23 may be struck with a hammer to drive the pipe 28.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A barrel and a pipe slidable therein, constituting a hydrostatic unit; transverse pipes upon said slidable pipe forming a handle thereupon; a hose connection upon one of said transverse pipes; a striking block upon said handle; and a lug upon said barrel adapted to engage said handle to rotate the hydrostatic unit.

2. A hydrostatic unit composed of two members one slidable within the other, and attachable to a pipe to be driven, and a striking block upon the slidable member of said hydrostatic unit.

3. A hydrostatic unit composed of two members one slidable within the other, and attachable to a pipe to be driven, and a lug upon the outer member of said unit adapted to contact with the slidable member of said unit to prevent the relative rotation of said members.

In witness whereof I claim the foregoing as my own I hereunto affix my signature in the presence of two witnesses at Portland, county of Multnomah, State of Oregon, this 24th day of May 1924.

PETER W. BRITTS.

Witnesses:
L. J. ROBINSON,
C. F. BLAKE.